March 9, 1926. Re. 16,284
C. SPAETH
HOSE NOZZLE
Original Filed Feb. 21, 1922
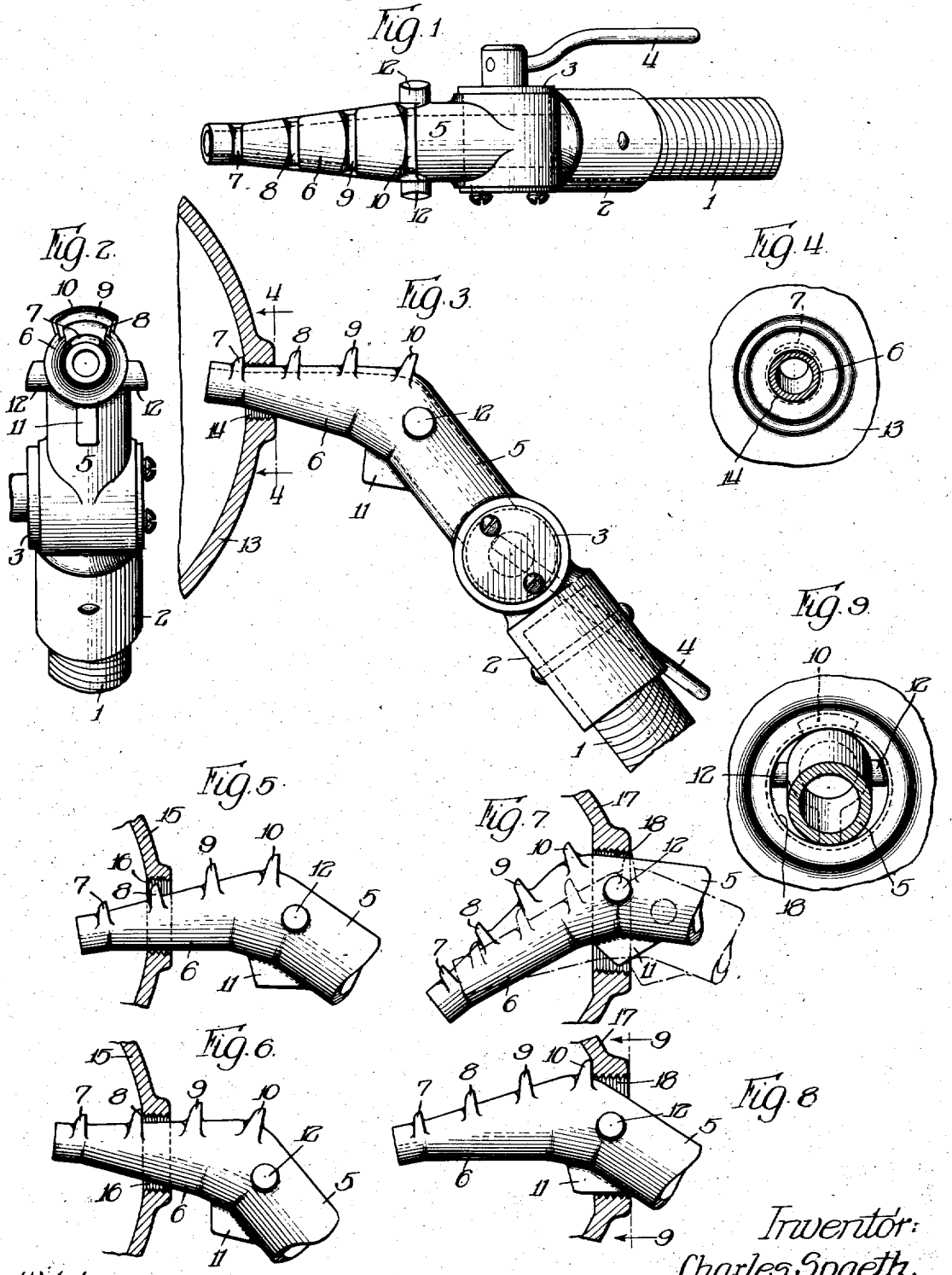
Witness:
R. Burkhardt
Inventor:
Charles Spaeth,
By Wilkinson, Huxley, Byron & Knight
Attys.

Reissued Mar. 9, 1926.

Re. 16,284

UNITED STATES PATENT OFFICE.

CHARLES SPAETH, OF CLEVELAND, OHIO, ASSIGNOR, BY MESNE ASSIGNMENTS, TO THE MARVEL EQUIPMENT COMPANY, OF CLEVELAND, OHIO, A CORPORATION OF OHIO.

HOSE NOZZLE.

Original No. 1,514,870, dated November 11, 1924, Serial No. 538,265, filed February 21, 1922. Application for reissue filed October 31, 1925. Serial No. 66,107.

*To all whom it may concern:*

Be it known that I, CHARLES SPAETH, a citizen of the United States, residing at Cleveland, in the county of Cuyahoga and State of Ohio, have invented certain new and useful Improvements in a Hose Nozzle, of which the following is a specification.

This invention relates to improvements in nozzles for grease pumps such as used at service stations for filling transmission gear housings of automobiles.

The main object of the invention is to provide a nozzle formed to anchor itself in the filling opening of the gear housing, so that it is unnecessary for an attendant to hold the nozzle in said opening while the grease is being pumped into the housing. In addition, it is the object of this invention to provide a nozzle capable of being locked within filling openings of various sizes, so that the locking feature may be utilized in filling the gear housings of automobiles of various makes.

In the annexed drawing forming a part of the following specification:

Fig. 1 is a top plan view of the improved nozzle.

Fig. 2 is an end elevation looking toward the discharge end of the nozzle.

Fig. 3 a view showing in section a portion of a gear housing having a small filling opening and in side elevation the nozzle locked in said opening.

Fig. 4 is a sectional view on line 4—4 of Fig. 3.

Fig. 5 is a view similar to Fig. 3 showing the nozzle entering an opening somewhat larger than the opening shown in Fig. 3.

Fig. 6 is a view showing the nozzle locked in the opening of the housing shown in Fig. 5.

Fig. 7 is a view similar to Figures 3, 5 and 6 showing a nozzle entering a considerably larger opening.

Fig. 8 is a view showing the nozzle locked in the opening of the housing shown in Fig. 7.

Fig. 9 is a sectional view taken on line 9—9 of Fig. 8.

Referring to the annexed drawings, the hose 1 leading from the grease pump is provided with a nozzle consisting of a rigid tubular member provided with an enlarged portion 2, adapted to be attached upon the end of the hose 1. Adjacent the attaching portion 2 the nozzle is provided with a valve housing in which is mounted a rotary valve 3 operable by means of a lever 4 attached to the stem of the valve 3. The portion 5 of the nozzle adjacent the valve is cylindrical and the discharge portion 6 of the nozzle is bent at an angle to the portion 5 and is conical, tapering towards the discharge end. The extension of the bend between the portions 5 and 6 is at the top of the nozzle. On the top of the conical discharge portion of the nozzle is a longitudinal row of uniformly spaced transversely extending arcuate lugs 7, 8, 9 and 10, the lug 7 being adjacent the discharge end of the nozzle and the lug 10 being at the bend between the intermediate portion 5 and the discharge portion 6 of the nozzle. The lug 8 is somewhat wider and higher than the lug 7, the lug 9 is somewhat wider and higher than the lug 8, and the lug 10 is somewhat wider and higher than the lug 9. The lugs 7, 8, 9 and 10 have their upper edges curved about a center somewhat above the axis of the discharge portion 6 of the nozzle so that when the portion 6 of the nozzle is inserted into a circular opening with the bottom of the nozzle sliding on the bottom of the opening the largest lug which will pass through the opening will substantially conform to the upper portion of the circular opening. Opposite the lug 10 at the inner portion of the bend between the portions 5 and 6 of the nozzle is a spacing rib 11 adapted to engage the bottom of a circular aperture and hold the nozzle in a position in which the lug 10 is in locking position. On the sides of the nozzle at diametrically opposite points adjacent the bend are horizontal centering and pivot forming lugs or trunnions 12. The number of locking lugs upon the discharge portion of the nozzle may of course be greater or less than shown. Four lugs, however, have been shown for the reason that this number will suffice for all the filling openings in automobile transmission housings of standard sizes. The lugs 7, 8, 9 and 10 are graduated to permit each to just pass through one of four standard openings.

In Fig 3 the transmission housing 13 has an opening 14 which will just receive the smallest lug 7. When the conical end 6 of the nozzle has been entered into the opening 14 far enough to bring the lug 7 inside the housing the nozzle is released and the rear end thereof drops by gravity fulcruming about the outer lower edge of the opening 14 and lifting the lug 7 into engagement with the interior of the housing above the upper edge of the opening and making it unnecessary for an attendant to hold the nozzle in place while the grease pump is being operated to fill the housing.

In Fig. 5 is shown the position in which the nozzle is held while it is being inserted in the opening, the housing 15 having an opening 16 through which the lug 8 will just pass. Fig. 6 shows the nozzle in locking position in the opening 16.

In Figs. 7, 8 and 9 is shown a transmission housing 17 having the largest size opening 18. In inserting the nozzle into the opening 18 the end 6 of the nozzle is turned downwardly as it is inserted so that the lug 10 is brought within the housing 17 and the trunnions 12 are brought opposite the opening. The nozzle is then lifted bodily until the trunnions 12, (the outer ends of which are curved) substantially fit within the opening with the lower edges thereof on a diameter of the opening as shown in Fig. 9. When the trunnions are so positioned the end 6 of the nozzle is swung upwardly bringing the rib 11 into engagement with the bottom of the opening 18 and the lug 10 into seating engagement with the interior of the housing 17 above the opening 18. In removing the nozzle the nozle end 6 is swung down about the trunnions as a center until the rib 11 is brough outside the housing permitting the nozzle to drop until the lug 10 is below the top of the opening 18 permitting the nozzle to be withdrawn.

The lugs 7 and 8 are made relatively wide and of arcuate form to more firmly hold the nozzle in place and to limit lateral movements of the nozzle in the opening during the filling operation, and the tapering form of the nozzle functions to close openings of different sizes. The locking lugs also extend different distances from the axis of the nozzle to permit locking engagement with the inner edge of the opening according to the size of the opening, and while this device has been especially designed for filling axle housings and different casings, it is not necessarily limited to this use but may also be employed with advantage in filling gasoline tanks and other receptacles having filling openings of different sizes.

There may be various modifications of the invention as herein particularly shown and described and it is my intention to cover all such modifications which do not involve a departure from the spirit and scope of the invention as defined in the following claims.

What I claim is:

1. A hose nozzle, comprising a rigid tubular member having a longitudinal row of spaced upwardly projecting lugs on the top thereof, the first of said lugs being adjacent the discharge end of said member, each succeeding lug in said row extending a greater distance from the axis of said tubular member than the preceding lug.

2. A hose nozzle, comprising a rigid tubular member tapering toward its discharge end and having a longitudinal row of spaced lugs arched transversely thereof, the first of said lugs being adjacent said discharge end, and the each succeeding lug being greater in width than the preceding lug.

3. A hose nozzle, comprising a rigid tubular member having a hose coupling extremity, and a conical discharge portion extending at an angle to said first mentioned portion, said discharge portion tapering toward its discharge end, and having a longitudinal row of spaced lugs extending from the tapering discharge portion, the ends of said lugs terminating different distances from the axis of said conical portion.

4. A grease pump nozzle comprising a rigid bent tubular member having an exterior lug thereon adjacent the outer side of the bend and a pair of aligned centering trunnions on the sides of said member adjacent the bend and engageable with the interior of a circular opening to center said member with respect to said opening and providing a pivot for said tubular member about which said lug can be swung into engagement with the interior of the wall above said opening.

5. A grease pump nozzle, comprising a rigid bent tubular member having an exterior lug thereon adjacent the outer side of the bend, and a spacing rib at the inner side of the bend adapted to engage the lower side of a circular opening and hold said lug in engagement with the interior of the wall above said opening.

6. A grease pump nozzle, comprising a rigid bent tubular member having an exterior lug thereon adjacent the outer side of the bend, a spacing rib at the inner side of the bend, and a pair of aligned centering trunnions on the sides of said tubular member adjacent the bend.

7. A grease pump nozzle, comprising a rigid bent tubular member having a cylindrical portion and a conical discharge portion extending at an angle thereto the exterior of the bend being at the top of said member said conical portion having a longitudinal row of spaced transversely extending arcuate lugs on the top thereof of a progressively decreasing width toward the discharge end, the end lugs of said row being located adjacent said bend and adjacent said discharge end, respectively, a spacing lug on the under side of said member at the bend, and a pair of aligned centering trunnions, one on each side of said tubular member adjacent the bend.

8. A gravity locking nozzle having a plural number of locking elements in spaced relation longitudinally thereon extending different distances from the axis of the nozzle, to permit gravity locking of the nozzle in filling openings of different sizes.

9. A fluid conducting nozzle comprising a member having a passageway through which fluid may pass and having permanently attached means selectively effective at different points along its length beginning at a point near the discharge end of the nozzle to releasably retain the nozzle in openings of different sizes.

10. A fluid conducting hose nozzle comprising a member having a passageway through which fluid may pass and having means varying in size selectively effective at different points along its length to releasably retain the nozzle in openings of different sizes.

11. A tapered fluid conducting nozzle comprising a member having a passageway through which fluid may pass, and permanently attached means effective at different points along said member to releasably retain the nozzle within an opening.

12. A fluid conducting nozzle comprising a tapered member having a passageway through which fluid may pass, and means effective at different points along said member to releasably retain the nozzle within openings of different sizes and substantially close said openings.

13. A fluid conducting nozzle comprising a tapered member having a passageway through which fluid may pass, and means on said member compensatory in effect to releasably retain the nozzle in openings of different sizes and substantially close said openings.

14. A fluid conducting nozzle comprising a tapered tubular member through which fluid may pass, and spaced means on said member compensatory in effect to releasably retain the nozzle in openings of different sizes and substantially close said openings.

Signed at Cleveland, Ohio, this 26th day of October, 1925.

CHARLES SPAETH.